March 20, 1956     W. H. HAUPT     2,738,998
CABLE ATTACHING DEVICE
Filed Nov. 13, 1952
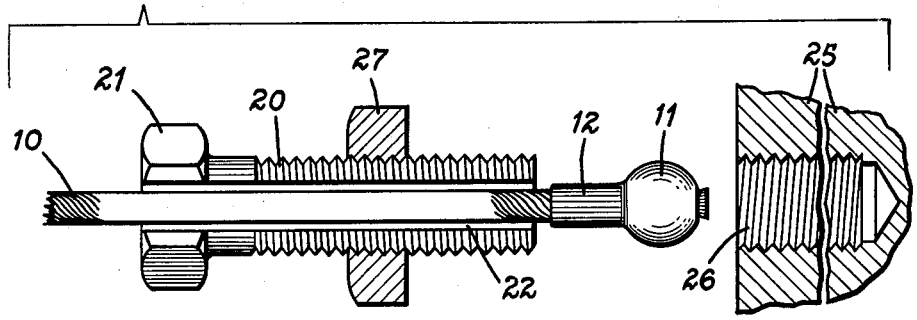
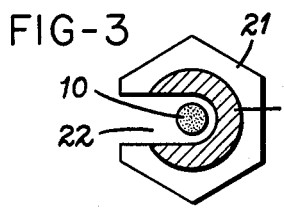
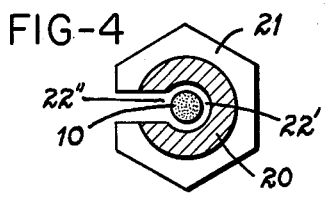
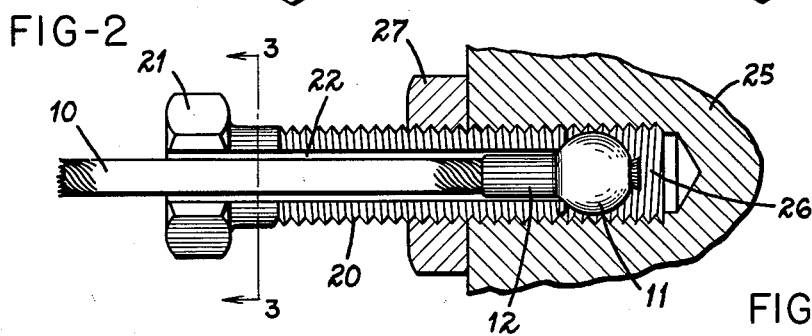
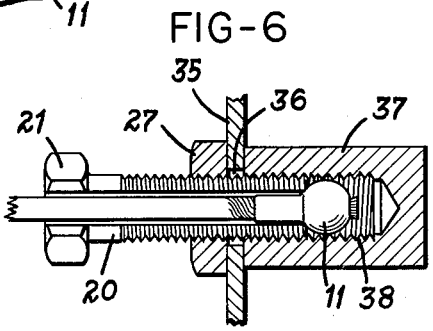
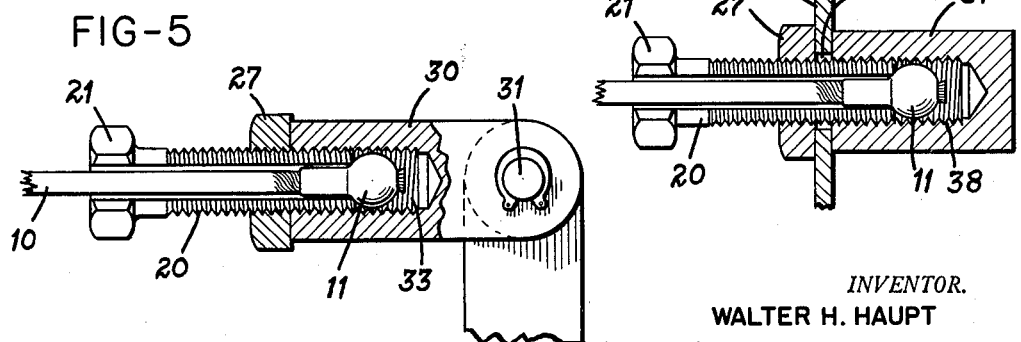
*INVENTOR.*
WALTER H. HAUPT
BY
ATTORNEYS

United States Patent Office 2,738,998
Patented Mar. 20, 1956

2,738,998

CABLE ATTACHING DEVICE

Walter H. Haupt, Kenton Hills, Ky., assignor to Keleket X-Ray Corporation, Covington, Ky., a corporation of Ohio Application November 13, 1952, Serial No. 320,235

3 Claims. (Cl. 287—20.5)

This invention relates to an attaching device for the end of a flexible cable, and the invention has special application to attaching wire cables and the like to either a fixed or a movable structure and especially to such installations where some initial adjustment is required but where also it is desired finally to form a fixed attachment maintaining predetermined length and tension in the cable.

The invention is particularly related to the attachment of wire, rope or other cables having enlarged ends, and one of the principal objects of the invention is to provide an attaching device for such cables which is simple to manufacture and use, which imposes minimum stress on the cable in installation, and which is sufficiently adjustable to compensate for substantial variation in the length of the cable required for a particular installation.

It is also an object of the invention to provide such an attaching device which is adapted for uses where the cable is to be attached to a base of substantial size and which requires for installation only a blind tapped hole in the base.

Other objects and advantages of the invention will be apparent from the following description, the accompanying drawing and the appended claims.

In the drawing—

Fig. 1 is a fragmentary view in side elevation showing the structure and mode of operation of a cable attaching device in accordance with the invention;

Fig. 2 is a view similar to Fig. 1 showing a typical completed installation of the device;

Fig. 3 is a section on the line 3—3 of Fig. 2;

Fig. 4 is a sectional view similar to Fig. 3 and showing a modified construction of the device; and Figs. 5 and 6 are views similar to Fig. 2 illustrating other completed installations of the cable attaching device of the invention.

The drawing illustrates a preferred embodiment of the invention in conjunction with a wire cable 10 of the type commonly used for many industrial applications including, for example, use as the flexible attaching means between moving parts in an X-ray table or X-ray tube stand and the counterweights or adjusting drives for such moving parts. The cable 10 is shown as provided with an enlarged end portion of a type also now in common industrial use which comprises a ball fitting 11 having an integral cylindrical shank portion 12, the fitting 11—12 being received over and swaged or otherwise permanently secured to the cable. As shown, the ball 11 is of substantially larger diameter than the cable, i. e., of the order of 2 to 2½ times the cable diameter.

The attaching device of the invention comprises essentially a machine bolt 20 of substantial length and of a diameter sufficiently larger than the ball end 11 to permit free insertion of the ball in a tapped hole of the proper complementary size to receive bolt 20. For example, if the ball 11 is of the order of 5/16 inch in diameter, satisfactory results have been obtained with the bolt 20 of a diameter of 3/8 inch, and the bolt is shown as provided with a flat sided head 21 of the usual type for cooperation with a wrench.

A recess or slot 22 is formed in the bolt 20 which extends axially the full length of the bolt including its head 21, and which is of sufficiently greater width than cable 10 and also of the shank portion 12 to receive the cable and shank freely therein. Also the slot 22 preferably extends radially into the interior of the bolt 20 to a sufficient distance to include the central axis of the bolt so that when the cable is inserted therein, it can be substantially aligned with the bolt axis. At the same time, the width of slot 22 is sufficiently less than the diameter of the ball 11 to prevent passage of the ball therethrough either axially or radially, as clearly shown in Fig. 2.

With the bolt 20 of this construction and these dimensions with respect to the cable and the fitting 11, attachment of the cable to a structural member or other base such as is indicated at 25 merely requires the provision of a tapped hole 26 in the base of the proper complementary dimensions to receive the bolt threadedly therein, and the hole 26 need not extend through the base but is at most required to be approximately equal in depth to the threaded portion of the bolt plus the axial length of the ball 11. With such a hole 26 provided in base 25, attachment of the cable requires only that it be inserted in slot 22 with the ball 11 at the leading end of the bolt, and then as the bolt is threaded into hole 26, it will carry the ball 11 into the hole ahead of it as shown in Fig. 2. Prior to insertion of the bolt in the hole, a nut 27 may be threaded thereon between the ball 11 and bolt head 21, and after the bolt has been threaded into the hole sufficiently to tighten the cable to the desired extent, the bolt 27 is tightened against the base to serve as a lock nut.

This attaching device offers numerous practical advantages from the standpoint of both economy and adaptability. Since its production requires only the cutting of a suitable slot in a standard machine bolt of the proper selected size, its production cost is extremely low, especially for quantity production such as may be carried out on a suitable screw machine or the like. In use, it offers a range of adjustability for the cable approximately equal to the threaded portion thereof, and while satisfactory results have been obtained with a bolt of the above size which is 1½ inches in length, this range of adjustability can obviously be increased if desired by the use of a longer bolt. It is therefore practical for users of the invention to purchase their required cables cut to a length falling within this adjustable range and provided at both ends with ball or similar enlarged fittings, thus eliminating the necessity for enlarging an unfinished end on the cable and correspondingly reducing the time required for installation.

It will also be seen that use of the attaching device imposes minimum twisting or like undesired stress on the cable in installation. Thus with the slot 22 so formed that the cable extends substantially along the axis of the bolt, an effectively swivel joint is provided between the ball 11 and the end of the bolt so that tightening of the bolt does not cause twisting of the cable. This result is particularly notable if the internal construction of bolt 20 is as shown in Fig. 4, namely with the slot therein having its central bore portion 22′ drilled to receive the shank portion 12 of the ball but with the remainder thereof not substantially wider than the thickness of the cable 10, as indicated at 22″, since this construction assures centering of the cable in the bolt.

It should further be noted that while the device of the invention is especially useful for attachment to large base parts where it is undesirable or impracticable to provide a through bore for attaching a conventional cable tensioning device, the invention is not limited to such installations. Thus Fig. 5 shows the device of the invention providing the attachment between the cable 10 and a lever 30 on a shaft 31, by means of a tapped bore 33 in the lever, and in Fig. 6, the device of the invention is shown in use for attaching the cable 10 to a comparatively thin metal plate 35. In this installation the plate 35 has a bore 36 freely receiving the bolt 20 therethrough, and at the back side of plate 35 is a suitably tapped nut 37 for threading on bolt 20. The nut 37 is shown as a block having a blind tapped bore 38 therein, but it will be apparent that this construction is not essential and that this nut could equally well be formed essentially as a duplicate of the lock nut 27. It will also be understood that these installations are shown as merely illustrative of the comparatively wide field of application for the cable attaching device of this invention.

While the article herein described constitutes a preferred embodiment of the invention, it is to be understood that the invention is not limited to this precise article, and that changes may be made therein without departing from the scope of the invention which is defined in the appended claims.

What is claimed is:

1. A terminal anchoring device of the character described for adjustably attaching to a base a cable having an end of predetermined greater diameter than said cable, comprising a threaded bolt of larger diameter than said cable end adapted to be threaded into a complementary tapped hole in said base, said bolt being of sufficiently greater diameter than said cable end to provide for free insertion of said end into such complementary tapped hole, said bolt having an enlarged head to facilitate threading thereof into such tapped hole, said bolt having a recess extending throughout the length thereof including said head and substantially along the axis thereof, said recess being of cross-sectional dimensions sufficiently greater than said cable to receive said cable freely therein but sufficiently smaller than said cable end to preclude passage of said end therethrough, said bolt being thereby adapted to receive said cable in said recess while retaining said cable end in advance thereof upon threaded insertion into such tapped hole, and a nut adapted for threading on said bolt between said cable end and said bolt head to serve as a lock nut in cooperation with said base maintaining said bolt and said cable end anchored in such tapped hole in said base.

2. A terminal anchoring device of the character described for anchoring to a base structure a cable having an end member secured thereon and of predetermined larger diameter than said cable, comprising an elongated body member of larger diameter than said cable, said body member including an extended cylindrical portion threaded along the outer surface thereof for insertion in a correspondingly internally threaded opening in the base structure, said body member having a slot-like recess extending substantially to the center thereof through one side thereof and along the entire length thereof, said recess being of larger diameter than said cable to receive said cable therein by relative lateral movement of said body member and said cable, said recess being of smaller diameter than said cable end member to prevent axial movement of said end member therethrough, said body member being of larger diameter than said cable end member to provide for threaded insertion of said body member in said internally threaded opening with said cable end member carried into said opening by said body member in advance of said threaded portion of said body member and thereby anchored in said base structure, and said body member having a non-circular head portion thereon facilitating threaded movement thereof into and out of said opening.

3. A terminal anchoring device of the character described for anchoring to a base structure a cable having an end member secured thereon and of predetermined larger diameter than said cable, comprising an elongated body member of larger diameter than said cable, said body member including an extended cylindrical portion threaded along the outer surface thereof for insertion in a correspondingly internally threaded opening in the base structure, said body member having a slot-like recess extending substantially to the center thereof through one side thereof and along the entire length thereof, said recess being of larger diameter than said cable to receive said cable therein by relative lateral movement of said body member and said cable, said recess being of smaller diameter than said cable end member to prevent axial movement of said cable end member therethrough, said body member being of larger diameter than said cable to provide for threaded insertion of said body member in said internally threaded opening with said cable end member carried into said opening by said body member in advance of said threaded portion of said body member, said body member having a non-circular head portion thereon facilitating threaded movement thereof into and out of said opening, and a nut on said threaded body portion for tightening in locking relation with said body member and said base structure to secure said cable end member in anchored relation with said base structure.

References Cited in the file of this patent

UNITED STATES PATENTS

| | | |
|---|---|---|
| 524,033 | Turner | Aug. 7, 1894 |
| 1,950,317 | Luneburg | Mar. 6, 1934 |
| 2,047,766 | Bruzon | July 14, 1936 |
| 2,055,667 | Murray | Sept. 29, 1936 |
| 2,242,783 | Grau | May 20, 1941 |
| 2,305,234 | Bratz | Dec. 15, 1942 |
| 2,349,741 | McLaughlin | May 23, 1944 |
| 2,375,548 | Gilmore | May 8, 1945 |
| 2,549,665 | Conrad | Apr. 17, 1951 |
| 2,571,052 | Mount | Oct. 9, 1951 |